(12) United States Patent
McBeath et al.

(10) Patent No.: US 7,930,295 B2
(45) Date of Patent: Apr. 19, 2011

(54) METHODS AND SOFTWARE FOR ANALYSIS OF RESEARCH PUBLICATIONS

(75) Inventors: Darin McBeath, Mason, OH (US);
Stephan Stipdonk, Leiden (NL);
M'hamed El Aisati, Amsterdam (NL);
Robbert Jan Kalff, Amsterdam (NL);
Usbrand Jan Aalbersberg, Amsterdam (NL)

(73) Assignee: Elsevier, Inc., New York, NY (US)

( * ) Notice: Subject to any disclaimer, the term of this patent is extended or adjusted under 35 U.S.C. 154(b) by 0 days.

(21) Appl. No.: 12/861,061

(22) Filed: Aug. 23, 2010

(65) Prior Publication Data
US 2010/0318509 A1    Dec. 16, 2010

Related U.S. Application Data

(63) Continuation of application No. 11/261,018, filed on Oct. 27, 2005, now Pat. No. 7,783,619.

(51) Int. Cl.
G06F 7/00 (2006.01)
G06F 17/30 (2006.01)

(52) U.S. Cl. .................. 707/713; 707/759; 707/769

(58) Field of Classification Search ............... 707/713, 707/715, 759, 769, 776, 780, 999.004, 999.005
See application file for complete search history.

(56) References Cited

U.S. PATENT DOCUMENTS

| | | | |
|---|---|---|---|
| 5,544,352 A | 8/1996 | Egger | |
| 5,594,897 A | 1/1997 | Goffman | |
| 5,692,181 A | 11/1997 | Anand et al. | |
| 6,088,707 A | 7/2000 | Bates et al. | |
| 6,470,319 B1 | 10/2002 | Ryan | |
| 6,957,191 B1 | 10/2005 | Belcsak et al. | |
| 7,725,448 B2 * | 5/2010 | Beavin et al. | 707/705 |

(Continued)

FOREIGN PATENT DOCUMENTS

WO    WO 02/091155    11/2002
(Continued)

OTHER PUBLICATIONS

De Groot S P et al: "Applying the User-Centered Design (UCD) process to the development of a large bibliographic navigation tool: a partnership between librarian, researcher and developer." Internet Publication [Online], Jun. 16, 2004, http://www.elsevier.com/framework+librarians/WhitePapers/White_Paper_1_Usability_Testing.pdf: see section "use of citations" and abstract.

(Continued)

*Primary Examiner* — Hung Q Pham
*Assistant Examiner* — Marc Somers
(74) *Attorney, Agent, or Firm* — Troutman Sanders, LLP

(57) ABSTRACT

In one aspect, the invention comprises a computer system for searching databases and displaying search results, comprising databases storing information regarding publications and authors comprising author, title, date of publication, cited references, and citing references data; and Internet servers in communication with those databases; wherein at least one of those Internet servers is in communication with and operable to transmit data to a Web browser resident on a user's computer, and wherein the data is sufficient to enable the browser to display a citation overview page comprising: (a) a list of one or more titles of publications or names of authors, and (b) one or more displayed numerals representing how many publications in one or more specified categories cite to each of the publications, or, for author names, how many publications in one or more specified categories cite to publications on which those names are listed as authors.

20 Claims, 20 Drawing Sheets

U.S. PATENT DOCUMENTS

| | | |
|---|---|---|
| 2001/0003818 A1 | 6/2001 | Pingel et al. |
| 2002/0022974 A1 | 2/2002 | Lindh |
| 2002/0156760 A1 | 10/2002 | Lawrence et al. |
| 2003/0001873 A1 | 1/2003 | Garfield et al. |
| 2005/0060287 A1 | 3/2005 | Hellman et al. |
| 2005/0120239 A1 | 6/2005 | Monroe et al. |

FOREIGN PATENT DOCUMENTS

| | | |
|---|---|---|
| WO | WO 03/107576 A2 | 12/2002 |

OTHER PUBLICATIONS

Garfield Eugene: "Citation Analysis as a Tool in Journal Evaluation", Essays of an Informed Scientist, [Online] vol. 1, 1972, pp. 527-544, available at http://cybermetrics.cindoc.csic.es/cybermetrics/pdf/569.pdf.

Hitchcock S et al: "Evaluating Citebase, an open access Web-based citation-ranked search and impact discovery service" Internet Publication—Technical Report, [Online] Jul. 2003, University of Southhampton, available at http://opcit.eprints.org/evaluationlCitebase-evaluation-report-tr.pdf; see abstract, section 2.2, section 7.2, section 4 and figure 4.1.

Lawrence S et al: "Digital Libraries and Autonomous Citation Indexing", Computer, IEEE Service Center, Los Alamitos, CA, vol. 32, No. 6, Jun. 1999, pp. 67-71, ISSN: 0018-9162; see section "Querying and Browsing" and figure 2.

Mark Logic Corp: "Mark Logic Content Interaction Server-Developer's, Guide", Internet Publication [Onine], Oct. 7, 2004, available at: http//xqzone.marklogic.com/pubs/2.2/books/dev_guide.pdf; see section 9.0 and section 11.0.

Smit E: "Evidence-based Development of e-products" Internet Publication [Online], Oct. 18, 2004, available at http:www.infonortics.com/chemical/ch04/slides/smit-2.pdf.

"About CiteSeer," CiteSeer, Aug. 14, 2003, http://web.archive.org/web/20038141504 46/citeseer.ist.psu.edu/citeser.html.

"Computer Science Papers NEC Research Institute CiteSeer Publications Research Index," CiteSeer, Oct. 4, 2002, http://web.archive.org/20021004012343/citeseer.nj.nec.com/cs.

Sartiani; A Framework for Estimating XML Query Cardinality, Jun. 12, 2003; International Workshop on the Wed and Databases (WedDB) (Examiner's report, Mar. 18, 2008, our ref. 61998-5003DE).

Mark Logic—XQuery Function Online Documentation, http://developer.marklogic.com/pubs/3.2/apidocs/Extension.html, accessed on Dec. 8, 2009, published on Jan. 5, 2009, 73 pages.

Polyzotis et al, "Approximate XML Query Answers," Proceedings from the SIGMOD 2004 Conference, Paris, France, Jun. 13-15, 2004, 12 pages.

Carmel et al, "Searching XML Documents via XML Fragments," Proceedings from SIGIR 2003 Conference, Toronto, Canada, Jul. 28-Aug. 1, 2003, pp. 151-158.

* cited by examiner

FIG. 2

SCOPUS | Basic | Advanced | Author

Search in: Scopus ▼ Go

Author Name:

Last Name
Sato
E.g., Smith

Initials or First Name
H
E.g., J.L.

⑦ Search Tips

↻ Search | Clear

Results: 54     Results 1 to 50 | next ▲

⧉ show documents    🗐 citation overview — 220

▼ Authors | Documents

Select: ☐ All ☐ Page

1. ☐ Sato, H    139
2. ☐ Sato, H.A.    21
3. ☐ Sato, H.J.    45

210 subscription information
All publication years; from January 1960 onwards

Library OPAC | LSI Journal Link #3

Documents Available From | View
⊞ Volume 33
⊟ Volume 32
- Volume 32 Issue 3, Pages 221-318 (August 2003)    📊 Citation Overview
- Volume 32 Issue 2, Pages 107-220 (May 2003)    📊 Citation Overview
- Volume 32 Issue 1, Pages 1-105 (February 2003)    📊 Citation Overview
- Volume 32 Other    📊 Citation Overview
⊞ Volume 31
- 1995 (191 Documents)    📊 Citation Overview
- 1994 (157 Documents)    📊 Citation Overview
- 1993 (166 Documents)    📊 Citation Overview

SCOPUS

Register or Login: username    Password:    Go

[Search] [Journals] [My Alerts] [My List] [My Profile]    Scopus Labs   ? Help

Quick Search [        ] [Go]   ? Search Tips    Brought to you by Your Library

Citation Overview Results ( The 5 selected documents are cited 32 times by 27 documents in 1999 - 2003 ) —710

Refine Results   [ ( ) limit to ]  [ x exclude ]    [close]

| Source Title | Author Name | Year | Document Type | Subject Area |
|---|---|---|---|---|
| ☐ Brazilian Journal of Urology (5) | ☐ Nousari, H.C. (2) | ☐ 2002 (25) | ☐ Article (3) | ☐ Medicine, Life Sciences (21) |
| ☐ Journal of Nephrology (1) | ☐ Nousari, H.C. (2) | | ☐ Review (4) | ☐ Biology, Agriculture and Environmental Science (5) |
| ☐ Anticancer Research (1) | ☐ Tadokoro, K. (1) | | ☐ Conference paper (4) | ☐ Medicine, Life Sciences (2) |
| More... | More... | | More... | More... |

Results: 27    Results 1 to 25 [next ▶]

[print] [export] [e-mail] [add to list]    Select: ☐ All ☐ Page

| | ▼ Date | Document (Sort by Title) | Author(s) | Source Title | Cited By |
|---|---|---|---|---|---|
| 1. ☐ | 2002 | Inflammatory pseudopapilloma after recurring aspiration of fruit stones as rare differential diagnosis of bronchogenic cancer [Abstract + Refs] from Scopus [Full Text] | Walther, J.W. Kollimeier, J. De Zeeuw, J.  Orth, M. Wiethege, A. Muller, K.M. Schultze-Werninghaus, G. Rasche, K. | Pneumologie, 56 (7), pp. 438 - 442 | 0 |
| 2. ☐ | 2002 | Post-Traumatic stress disorder: A review (part one) [Abstract + Refs] from Scopus | Palacios, A. Heinze, G. | Salud Mental, 25 (3), pp. 19-26 | 0 |
| 3. ☐ | 2001 | Coexistence of pseudoxanthome elasticum - like papillary dermal elastolysis and linear focal dermal elastosis [Abstract + Refs] from Scopus [Full Text] | Akagi, A. Tajima, S. Kawada, A. Ishibashi, A. | Journal of the American Academy of Dermatology 47 (2), pp 5189 - 192 | 0 |

Display [25 ▼] results per page    Search with results [        ] [Go]

Results 1 to 25 [next ▶]

[Search] [Journals] [My Alerts] [My List] [My Profile]    Scopus Labs   ? Help

About Scopus | Feedback | Terms & Conditions | Privacy Policy    Your Library

Copyright © 2003 Elsevier B.V. All rights reserved. Scopus™ is a trademark of Elsevier B.V.

FIG. 7

SCOPUS

Print Citation Overview 820

◄ Return | Date of creation: 29 March 2004    Selection: 1 - 100 (out of 325)    [Click to Print]
Citation Range: 2001 - Present    Citation weight: 1.14
(371 citations / 325 documents)

| | | Cited by | | | | |
|---|---|---|---|---|---|---|
| | | 2001 | 2002 | 2003 | 2004 | |
| Documents | Total | 125 | 64 | 78 | 104 | 371 |
| 1 (2002) Nest site selec... | | 2 | 5 | 1 | | 8 |
| 2 (1997) Patients with P... | | 1 | | 4 | 4 | 9 |
| ... | ... | | | | | ... |
| 99 (1996) Majority Influe... | | | | 3 | 1 | 4 |
| 100 (1984) Selecting test... | | 2 | 1 | | | 3 |

1-100 / 325

Documents in overview

1)
Thomas M.L., Marsden C.D.
Nest site selection and longelivety in the ponerine ant Rhytidoponera metallica (Hymenoptera, Formicidae)
*(2002) Insectes Sociaux. 49, pp. 147-152.*

2)
Day B.L., Dick J.P., Marsden C.D.
Patients with Parkinson's disease can employ a predictive motor strategy
*(1997) J. Neurol. Neurosurg. Psychiatry. 47, pp. 1299-1306*

99)
Day B.L., Dick J.P., Marsden C.D.
Majority Influence Process and panic attacks
*(1996) J. Neurol. Neurosurg. Psychiatry. 47, pp. 1299-1306.*

100)
Day B.L., Dick J.P., Marsden C.D.
Selecting test item types in psychological reviews
*(1984) J. Neurol. Neurosurg. Psychiatry. 47, pp. 1299-1306.*

Copyright © 2003 Elsevier B.V. All rights reserved. Scopus™ is a trademark of Elsevier B.V.

Author search results

SCOPUS

| Search | Sources | My Alerts | My List | My Profile |

*Easily find relevant results from over 12,000 peer-reviewed journals*

Register or Login: [username]  Password: [    ] [Go]

Brought to you by
Your Library    ○ Scopus Labs  ● Library Catalogue  ⓘ Help

Basic | Advanced | Author

Last Name          Initials or First Name
Author Name: [Brown]           [          ]
E.g., Smith                    E.g., J.L.
                               ⓘ Search Tips
                               [🔍 Search] [Clear]

↻ Results: 54    [📄 show documents] [📊 citation overview] [✓ Save selection]    Select: ☐ All ☐ Page    Results 1 to 50 [next ▲]

▼ Authors                    Documents

1 ☐ Brown, A.          821
2 ☐ Brown, A.D.         44
3 ☐ Brown, B.          360
4 ☐ Brown, C.          860
5 ☐ Brown, D.         1294
6 ☐ Brown, D.A.        108
7 ☐ Brown, D.H.         18
8 ☐ Brown, D.L.         83
9 ☐ Brown, D.N.         56
10 ☐ Brown, E.R.        39
11 ☐ Brown, G.         693
12 ☐ Brown, G.G.        34

1110

Select one or
more authors to
generate a citation
overview of.

My List with all documents checked

SCOPUS   Register or Login: [    ]   Password: [    ] [Go]

[Search] [Sources] [My Alerts] [My List] [My Profile]   ♀ Scopus Labs   ⓘ Help

Quick Search [        ] [Go]  ⓘ Search Tips    Brought to you by Your Library   ● Library Catalogue

My List - energy list 20 results in this list  Save this List

⊂⊃ Refine Results   ( ) limit to   ✗ exclude   [close]

| Source Title | Author Name | Year | Document Type | Subject Area |
|---|---|---|---|---|
| ☐ Molecular Physics (3) | ☐ Conlisk A.J. (3) | ☐ 2004 (1) | ☐ Article (18) | ☐ Engineering (7) |
| ☐ Journal of Catalysis (2) | ☐ Beswick A.J. (2) | ☐ 2000 (17) | ☐ Short survey (1) | ☐ Life Sciences (6) |
| ☐ Archives of Microbiology (1) | ☐ Kareogmenoghu F. (2) | ☐ 1999 (2) | | ☐ Health (2) |
| More... | More... | | | More... |

⊂⊃ Results: 20    1520    Results 1 to 25

[🖨 print] [⇨ export] [✉ e-mail] ([☰ citation overview]) [✓ save] [✗ delete]  Select: ☐ All  ☐ Page Check documents to generate citation overview

| ▼ Date | Document (Sort by reference) | Author(s) | Source Title | Cited By |
|---|---|---|---|---|
| 1. ☑ 2004 | Evolution of Optical Fiber Temperature during Fiber Bragg Grating Fabrication Using KrF Excimer Laser [Abstract + Refs] | Nakamur M. Komatsu C. Masuda Y. Fujita K. Suzaki Y. Yokouchi T. Nakagawa K. Komatsu C. | Japanese Journal of Applied Physics, Part 1: Regular Papers and Short Notes and Review Papers, 43(1), pp. 147-151 | 1 |
| 2. ☑ 2002 | Inelastic neutron scattering spectroscopy of C50@celix[8]orene [Abstract + Refs] | Paci B. Deleuze M.S. Caciuffo R. Arduini A. Zerbetto F. | Molecular Physics, 98(9), pp. 567-572 | 2 |
| 3. ☑ 2002 | Analysis of free energy functional density expansion theories [Abstract + Refs] | Sweatman M.B. | Molecular Physics, 98(9), pp. 573-581 | 8 |
| 4. ☑ 2002 | A comparison of finite basis set and finite difference Hartree-Fock calculations for the open-Shell (X2/£+) molecules BeF,MgF,CaF and SrF [Abstract + Refs] | Kobus J. Moncrieff D. Wilson S. | Molecular Physics, 98(7), pp. 401-407 | 2 |
| 5. ☑ 2001 | Determinants of fasting glucose in young Guatamaian adults [Abstract + Refs] | Conlisk A.J. Stein A.D Schroeder D.G. Martorell R. Conlisk A.J. Torun B. Grajeda R ... Conlisk A.J. | Ethnicity and Disease, 11(4), pp. 585-597 | 2 |
| 6. ☑ 2001 | Nanostructures of gold coated iron-shell nanoparticles and nanobands assembled Under magnetic field [Abstract + Refs] | Zhou W.L Carpenter E.E. Lin J. Kumbhar A. Sims J. O'connor C.J. | European Physical Journal D, 8(3), pp. 289-292 | 5 |

Document Citation Overview

Citation Overview for 20 selected documents  add author

Display Citations Published: [2000 ▼] - [2003 ▼] [Update]

| Documents | <1999 | 2000 | 2001 | 2002 | 2003 | total | >2004 | total |
|---|---|---|---|---|---|---|---|---|
| Total | 0 | 29 | 77 | 103 | 90 | 307 | 38 | 343 |
| 1(2000) ⓘ Determinants of fasting glucose in young... | | | | | | 0 | 2 | 2 |
| 2(2000) ⓘ Inelastic neutron scattering... | | | 2 | | | 2 | | 2 |
| 3(2000) ⓘ The influence of non-dipolar... | | | 2 | 2 | | 4 | 1 | 5 |
| 4(2004) ⓘ Evolution of Optical Fiber Temperature... | | | | | | 0 | 1 | 1 |
| 5(2000) ⓘ On the interpretation of the multicolour... | | | 2 | 10 | 11 | 23 | 3 | 26 |
| 6(2000) ⓘ Reduction of chromate by microorganisms... | | | 1 | 3 | 1 | 5 | | 5 |
| 7(2000) ⓘ The changing lifestyle in the world Body... | | 1 | 1 | 3 | 6 | 11 | 2 | 13 |
| 8(2000) ⓘ Regulation of tumor angiogenesis by... | | 28 | 51 | 54 | 54 | 187 | 18 | 205 |
| 9(2000) ⓘ Inhibition of photosynthesis by viral... | | | | 2 | 5 | 7 | 2 | 9 |
| 10(2000) ⓘ Biochar from the straw-stalk of rapeseed... | | | | | 3 | 3 | 3 | 6 |
| 11(2000) ⓘ Physiological roles of trehalose in... | | | 2 | 6 | 6 | 14 | 1 | 15 |
| 12(2000) ⓘ Subcutaneous central fat is associated... | | | 3 | 4 | 1 | 8 | 1 | 9 |
| 13(2000) ⓘ Detection of biological threat agents by... | | | 2 | 1 | 3 | 6 | 1 | 7 |
| 14(2000) ⓘ Damage induced by 1-30 eV electrons on... | | | 2 | 4 | 3 | 9 | 1 | 10 |
| 15(2000) ⓘ Anomalously large oxygen-ordering... | | | 1 | 5 | 1 | 7 | 2 | 9 |
| 16(2000) ⓘ Analysis of free energy functional... | | | 3 | 3 | | 6 | | 6 |
| 17(2000) ⓘ Nanostructures of gold coated iron... | | | | 1 | 4 | 5 | | 5 |
| 18(1999) ⓘ Temperature programmed desorption of... | | | 2 | 2 | | 4 | | 4 |
| 19(2000) ⓘ A comparison of finite basis set and... | | | 2 | | | 2 | | 2 |
| 20(1999) ⓘ A kinetic study on the adsorption and... | | | 1 | 3 | | 4 | | 4 |

Display [25 ▼] Documents                                    1 to 25  [next ▶]

```
<item>
<item-info>
<item-id type="SCP">210000003</item-id>
<citation-id>210000003</citation-id>
<publicationdate>                                          In all records (dummy, core without refs, core with refs)
  <year>1995</year>
  <citation-id-scp>210000003</citation-id-scp>           In all core records (with and without references)
  <core-1995/>
</publicationdate>
<citation-id-sgr>210000003</citation-id-sgr>             Only in core records with references
<citation-year>1995</citation-year>
<core-refs-1995>
</item-info>
<bibliography refcount="35">
  <references>
    <reference>
      <reference-id-scp>25445566</reference-id-scp>      Only in core records with references
    </reference>
    <reference>
      <reference-id-scp>8933634</reference-id-scp>
    </reference>
    <reference>
      <reference-id-scp>2079458</reference-id-scp>
    </reference>
```

FIG. 19 xdmp:estimate(//references[.//citation-year = $year][.//reference-id-scp = $eid])

| | Queries per second | | | | Milliseconds to return (95% of queries) | | | | Milliseconds per cell (average) | | | |
|---|---|---|---|---|---|---|---|---|---|---|---|---|
| Thread | 50 rows x 1 | 100 rows x 1 | 150 rows x 1 | | 50 rows x 1 | 100 rows x 1 | 150 rows x 1 | | 50 rows x 1 | 100 rows x 1 | 150 rows x 1 | |
| 1 | 12.37 | 7.31 | 5.13 | | 102 | 175 | 234 | | 1.62 | 1.37 | 1.30 | |
| 2 | 14.23 | 8.09 | 5.71 | | 214 | 349 | 482 | | 1.41 | 1.24 | 1.17 | |
| 4 | 13.34 | 7.18 | 4.94 | | 416 | 783 | 1,098 | | 1.50 | 1.39 | 1.35 | |
| 8 | 13.19 | 7.08 | 4.70 | | 873 | 1,530 | 2,268 | | 1.52 | 1.41 | 1.42 | |
| 16 | 14.03 | 6.83 | 4.41 | | 1,387 | 3,186 | 4,845 | | 1.43 | 1.46 | 1.51 | | xdmp:estimate(//core-1997[.//reference-id-scp = $eid])

| | Queries per second | | | | Milliseconds to return (95% of queries) | | | | Milliseconds per cell (average) | | | |
|---|---|---|---|---|---|---|---|---|---|---|---|---|
| Thread | 50 rows x 1 | 100 rows x 1 | 150 rows x 1 | | 50 rows x 1 | 100 rows x 1 | 150 rows x 1 | | 50 rows x 1 | 100 rows x 1 | 150 rows x 1 | |
| 1 | 15.70 | 8.80 | 6.17 | | 81 | 143 | 185 | | 1.27 | 1.14 | 1.08 | |
| 2 | 17.78 | 10.00 | 6.80 | | 143 | 266 | 409 | | 1.12 | 1.00 | 0.98 | |
| 4 | 18.45 | 9.64 | 6.59 | | 302 | 563 | 824 | | 1.08 | 1.04 | 1.01 | |
| 8 | 18.88 | 10.05 | 6.64 | | 591 | 1,112 | 1,651 | | 1.06 | 1.00 | 1.00 | |
| 16 | 18.23 | 9.93 | 6.58 | | 1,308 | 2,169 | 3,323 | | 1.10 | 1.01 | 1.01 | |

Tests across 29000000 total records uniformly distributed through 10 forests across 2 dual CPU Solaris systems (SunFire v240s), separate single query evaluation server, all servers running Content Interaction Server 2.2-prealpha

FIG. 20 xdmp:estimate(//item[.//year = $year][.//reference-id-scp = $eid])

Average query rate (100 cells, 1 thread):  4.25 per second
Mean query time:                            235 ms
Return time (50% of queries):               226 ms
Return time (95% of queries):               280 ms xdmp:estimate(//references[.//year = $year][.//reference-id-scp = $eid])

Average query rate (100 cells, 1 thread):  6.97 per second
Mean query time:                            144 ms
Return time (50% of queries):               136 ms
Return time (95% of queries):               187 ms xdmp:estimate(//core-1997[.//reference-id-scp = $eid])

Average query rate (100 cells, 1 thread):  8.81 per second
Mean query time:                            113 ms
Return time (50% of queries):               109 ms
Return time (95% of queries):               140 ms Tests across 29000000 total records uniformly distributed through 10 forests across 2 dual CPU Solaris systems (SunFire v240s), separate single query evaluation server, all servers CIS 2.2-prealpha

FIG. 21

METHODS AND SOFTWARE FOR ANALYSIS OF RESEARCH PUBLICATIONS

CROSS-REFERENCE TO RELATED APPLICATIONS

This application is a continuation of U.S. patent application Ser. No. 11/261,018, filed Oct. 27, 2005, which claims the benefit of U.S. Provisional Application No. 60/622,710, filed Oct. 27, 2004. The entire contents of both applications are incorporated herein by reference.

BACKGROUND & SUMMARY

In one aspect, the present invention comprises a document citation overview tool (CTO) that allows users to see how often documents from different resources (particular authors, journals or record baskets) have been cited in a selected year range. CTO fulfills a need in the scientific market for easy to use tools for bibliometric analyses.

On the document citation overview page (see FIG. 1), a two-dimensional table is used to display citation counts. There are varieties of citation counts provided by this table:
  By selected document and selected year (cell value)
  By selected document and selected year range (row total)
  By all selected documents and per selected year (column total)
  By all selected documents and selected year range (grand total)

Thousands of documents may be analyzed together. Users can select a year range, configure the number of documents displayed on each page if multiple pages are needed for display, and navigate pages through "previous" and "next" buttons. A citation weight may be displayed that shows the number of citations (grand total) divided by the number of all selected documents for the selected year range.

Users also may save a document set into a saved basket and access a cited-by-result list by clicking a citation count to display all citations associated with that count. In various embodiments, in addition to using dimensions of document and year, users can search on other parameters (author names, institutes, journal names, subjects, etc.) in various combinations.

Although those skilled in the art will be able to make and use a citation tool and citation overview pages based on the functional description below, additional technical solutions to technical problems were required in order to have a citation tool capable of providing search results in a short period of time. Users typically are not satisfied with great results if those results take too long to obtain. Those technical solutions also are described herein.

A strategy that likely would have been used by those familiar with the prior art, would have been to use a naive XQuery approach for the citation queries.

EXAMPLE

```
define function classifyCitedReferencesByYear($eid-list as item( )*) as item( )*
{
    for $eid in $eid-list return
        <eid id="{$eid}">
            {classifyCitedReferenceByYear($eid)}
        </eid>
}
```

-continued

```
define function classifyCitedReferenceByYear($eid as item( )) as item( )*
{
    let $allYears:= data(/ANI-RECORD
                    [BIBLIOGRAPHY/reference/ref-info/refd-
itemidlist/itemid[@idtype="SCP"] = $eid]
                    /ANI-SOURCE/publicationdate/year)
    let $uniqueYears := distinct-values($allYears)
    for $y in $uniqueYears
    return
        <classification type="year" value="{$y}"
        count="{count(index-of($allYears,$y))}" /> }
<eidList>
    {classifyCitedReferencesByYear((eids go here)))}
</eidList>
```

But this approach has several drawbacks: (1) the use of distinct-values( )requires all values to be in memory simultaneously; (2) complex XPath expressions require post-filtering of data structures to confirm that index hits are correct; and (3) an I/O is required for every referring document, to fetch the year data. Clearly, this approach does not scale well.

Goals of the present invention include: (1) resolve a query entirely out of indexes; (2) minimize index-related disk I/O; and (3) minimize per-cell computation time.

The preferred solution, described below, is based on a strategy that: (a) uses xdmp:estimate( ) to constrain counting activities to index-only computation; and (b) uses a combination of index techniques to optimize the caching of the indexes so that steady-state evaluation of a query will resolve disk-free.

In one aspect, the present invention comprises a computer system for searching databases and displaying search results, comprising: one or more databases storing information regarding publications, the information comprising author, title, date of publication, cited references, and citing references data; and one or more Internet servers in communication with the one or more databases; wherein at least one of the one or more Internet servers is in communication with and operable to transmit data to a Web browser resident on a user's computer, and wherein the data is sufficient to enable the browser to display a citation overview page comprising: (a) a list of one or more titles of publications, and (b) one or more displayed numerals representing how many publications of one or more specified categories cite to each of the publications.

In various embodiments, in various combinations: (1) one or more specified categories correspond to publication years; (2) at least one of the one or more displayed numerals represents a grand total of how many publications of all specified categories citing to any of the listed publications; (3) the citation overview page comprises a citation weight display that represents the grand total divided by how many publications are listed on the citation overview page; (4) the displayed numerals are hyperlinks; and/or (5) the data is sufficient to enable the browser to display a cited by result page linked to one of the one or more displayed numerals and listing publications in a category corresponding to the one of the one or more displayed numerals.

In another aspect, the invention comprises a computer system for searching databases and displaying search results, comprising: one or more databases storing information regarding publications, the information comprising author, title, date of publication, cited references, and citing references data; and one or more Internet servers in communication with the one or more databases; wherein at least one of the one or more Internet servers is in communication with and operable to transmit data to a Web browser resident on a user's computer, and wherein the data is sufficient to enable the browser to display a citation overview page comprising: (a) a list of one or more names of authors, and (b) for each of the names, one or more numerals representing how many publications of one or more specified types cite to publications on which that name is listed as an author or co-author.

In various embodiments, in various combinations: (1) the one or more specified categories correspond to publication years; (2) at least one of the one or more displayed numerals represents a grand total of how many publications of all specified categories citing to any of the listed names of authors; (3) the citation overview page comprises a citation weight display that represents the grand total divided by how many names of authors are listed on the citation overview page; (4) the displayed numerals are hyperlinks; (5) the data is sufficient to enable the browser to display a cited by result page linked to one of the one or more displayed numerals and listing publications in a category corresponding to the one of the one or more displayed numerals; (6) the citation overview page comprises an exclude author self citations button operable to send a request to the at least one of the one or more Internet servers for data sufficient to enable the browser to display a citation overview page with excluded author self citations for a selected name of an author; (7) the citation overview page with excluded author self citations for a selected name of an author comprises a first displayed numeral representing how many publications in one of the specified categories cited to publications that list the selected name as an author; and/or (8) the citation overview page comprises a second displayed numeral representing how many publications in the one of the specified categories but not listing the name as an author cited to publications that list the name as an author.

In other embodiments: (1) at least one of the one or more databases is an XML-based database; (2) the XML-based database is operable to be searched using XQuery statements that count how many publications in a specified category cite to a specified publication; (3) at least one of the XQuery statements is written as an estimated XPath and unnecessary XPath steps are eliminated; and (4) at least one of the XQuery statements is written with one or more predicate indexes and at least one of the predicate indexes is remapped into memory.

Other aspects and embodiments of the invention will be apparent to those skilled in the art after reviewing the drawings, detailed description, and claims provided below.

BRIEF DESCRIPTION OF THE DRAWINGS

FIG. 2 depicts a preferred author names list page.

FIG. 3 depicts a preferred source info page.

FIG. 4 depicts a preferred record basket page.

FIG. 7 depicts a preferred result page.

FIG. 8 depicts a preferred printer-friendly page.

FIG. 11 depicts a preferred author search results page.

FIG. 13 depicts a preferred Exclude Author Self Citations page.

FIG. 14 depicts a preferred citation overview page with excluded author self citations.

FIG. 15 depicts a preferred My List page.

FIG. 16 depicts a preferred My List document citation overview page.

FIG. 17 depicts a preferred My List document citation overview page with a roll-over tool tip feature.

FIG. 19 depicts sample test content.

FIGS. 20 & 21 depict exemplary test results.

DETAILED DESCRIPTION OF PREFERRED EMBODIMENTS

Various embodiments of the present invention are described herein. For ease of reference, we refer to these embodiments collectively as "CTO." However, as those skilled in the art will recognize, the invention itself is not limited to these embodiments or to particular details discussed herein. The scope of the invention is defined solely by the appended claims as presented and/or subsequently amended and by other claims that may be added later.

In one embodiment, CTO is used in conjunction with Scopus, a search tool that is also described in U.S. Provisional Patent Application No. 60/622,710, filed Oct. 27, 2004, and that may be found on the Scopus website at www.scopus.com.

A document citation overview page (described below) preferably can be accessed from the following locations on the Scopus website (although those skilled in the art will recognize that analogous pages on other search cites also work for linking to a document citation overview page):

1. From an Author Names List Page (See FIG. 2)

Figure 1:
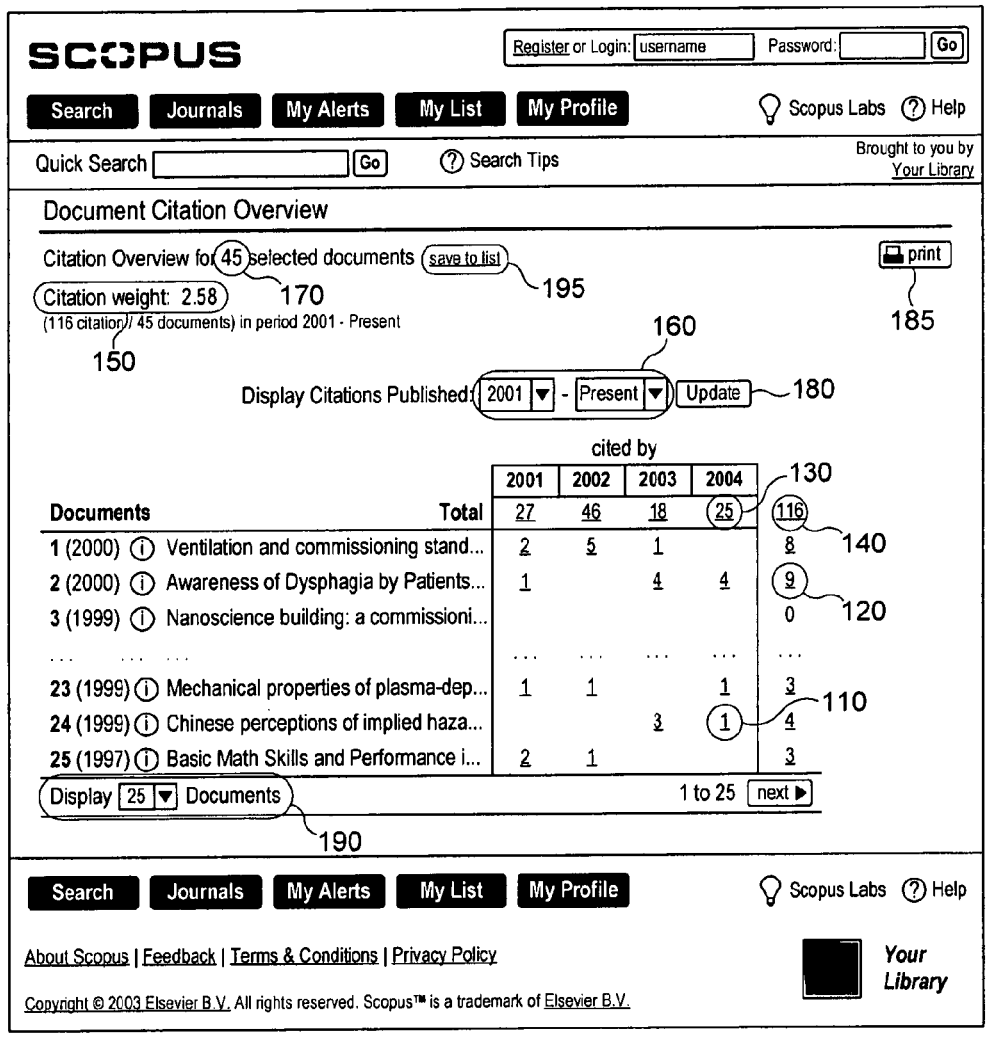
FIG. 1 depicts a preferred document citation overview page.

Selecting the checkboxes 210 next to author names and clicking on a "citation overview" button 220 will bring users to the document citation overview page (see FIG. 1). This page will contain all the documents from the selected authors. The year range is, by default, the last 3 years plus the current year.

2. From a Source Info Page (See FIG. 3)

Clicking on a "citation overview" link 310 next to a volume/issue/year will bring users to the document citation overview page (see FIG. 1). This page will contain all the documents from this volume/issue/year. The year range is, by default, the last 3 years plus the current year.

3. From a Record Basket Page (See FIG. 4)

Selecting the checkboxes 410 next to documents in a record basket (current or saved) and clicking on a "citation overview" button 420 will bring users to the document citation overview page (see FIG. 1). This page will contain all selected documents from that record basket. The year range is, by default, the last 3 years plus the current year, but may be adjusted.

Waiting Page

Figure 5:
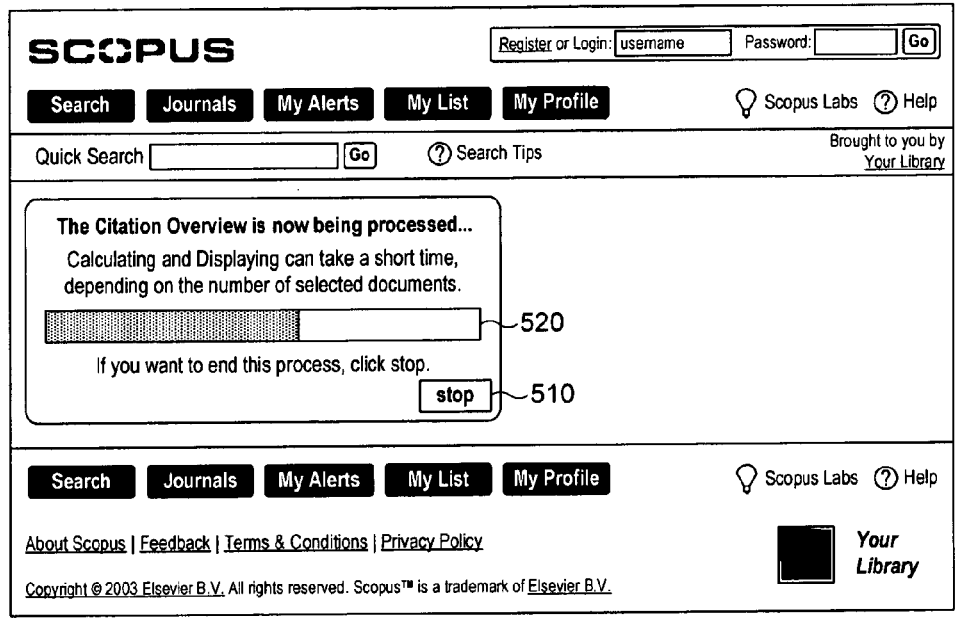
FIG. 5 depicts a preferred waiting page.
Figure 6:
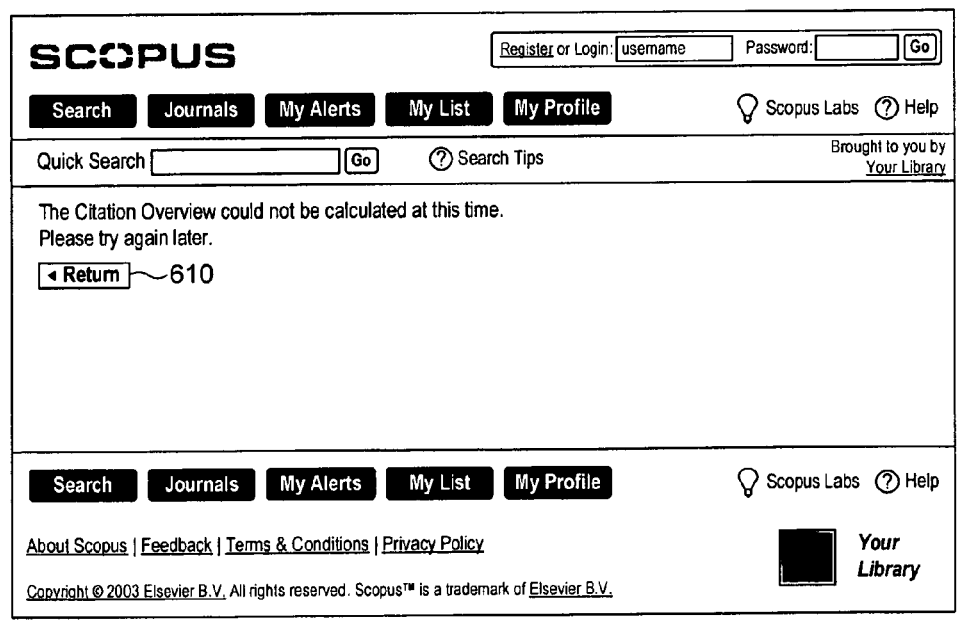
FIG. 6 depicts a preferred error page.

The citation analysis process is a computationally expensive operation and may be slow. A waiting page (see FIG. 5) may be displayed before the analysis data is rendered. A stop button 510 is provided on the waiting page to allow a user to go back to the calling page. If, for example, 60 seconds is expected for the typical analysis process to be completed, a fixed 60-second progress bar may be shown on the page. If the process time exceeds a preset time (say, 80 seconds), an error page may be displayed (see FIG. 6). A return button 610 on the error page works in a manner similar to the stop button 510 on the waiting page.

Citation Overview Page

Once the citation analysis data is ready, a document citation overview page (see FIG. 1) is rendered. Information rendered on this page includes a two-dimensional table to display various citation counts (cell value 110, row total 120, column total 130 and grand total 140) associated with these documents. A citation weight 150 may be displayed, under the control of a system configuration variable, which represents the number of citations (grand total) divided by the number of documents 170 for the selected year range 160. In FIG. 1, the citation weight has a value of 2.58 (grand total of 116 divided by number (45) of documents).

On the document citation overview page, selecting the start year or/and the end year from the corresponding dropdowns 160 and clicking "Update" button 180 will change the year range on the citation overview table and cause the citation analysis process to rerun against the newly selected year range. Selecting a number in the display documents dropdown 190 will change the maximum number of documents displayed per page. Clicking on the "previous" or "next" buttons will navigate through multiple pages.

Cited By Result Page

Clicking on a citation count link on the document citation overview page will bring users to a cited by result page (see FIG. 7) which lists all citations associated with that citation count. This result page will have functionalities that a regular Scopus search result page has, along with an information summary 710 for the listed citing documents.

Printer-Friendly Page

Clicking the "print" button 185 on the document citation overview page will bring users to a "printer friendly" page (see FIG. 8) that contains only the citation information in the current page (for the multi-page case)—not the whole table. This page also contains a copyright statement 810 and a date stamp 820.

Saved Record Basket Page

Figure 4:
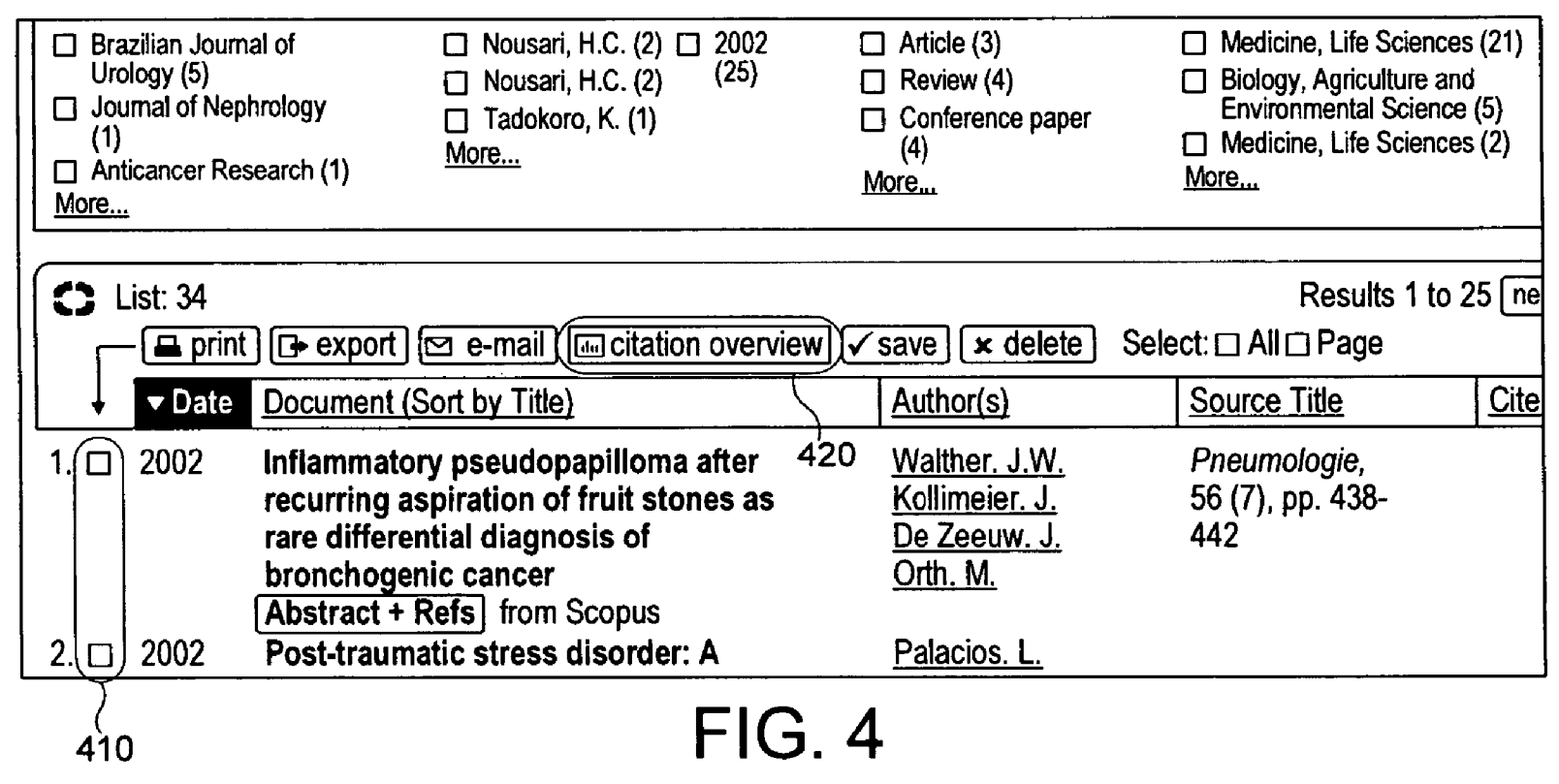

Clicking on the "save to list" link 195 on the document citation overview page will save all documents involved in that citation overview analysis (across all pages for a multi-page case) into a saved record basket (see FIG. 4).

Figure 9:
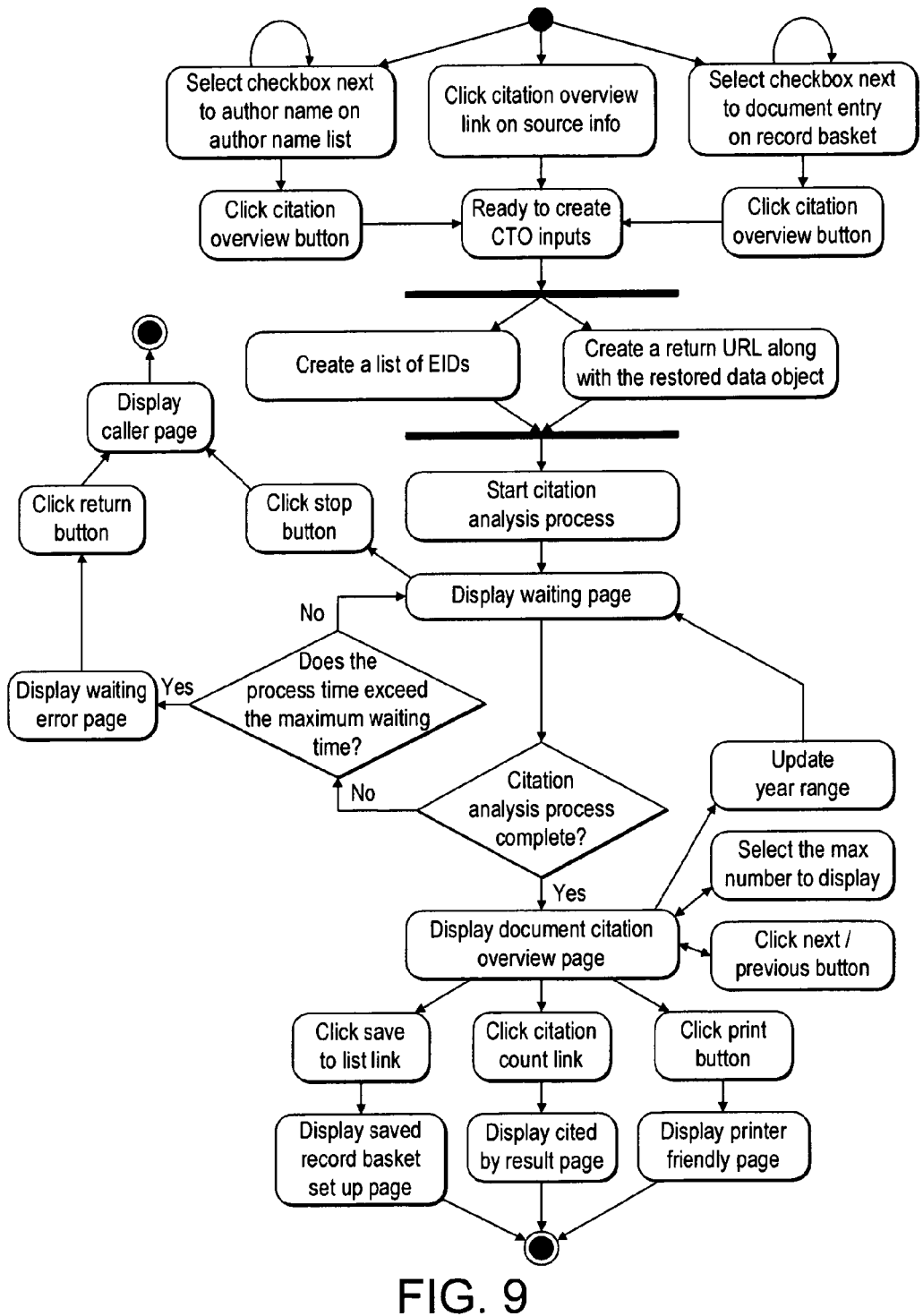
FIG. 9 is an activity diagram summarizing preferred processes.

FIG. 9 depicts an activity diagram summarizing the activities described above. EIDs are author IDs.

Figure 10:
FIG. 10 depicts a preferred author search form page.

In another embodiment, a user first accesses an Author search form (see FIG. 10) and types an author's name (in this example, "Brown"). An Author search results page then is displayed (see FIG. 11), listing authors identified as corresponding to the entered search terms (in this example, all authors whose last name is (or begins with) "Brown").

Figure 12:
FIG. 12 depicts a preferred author citation overview page.
Figure 18:
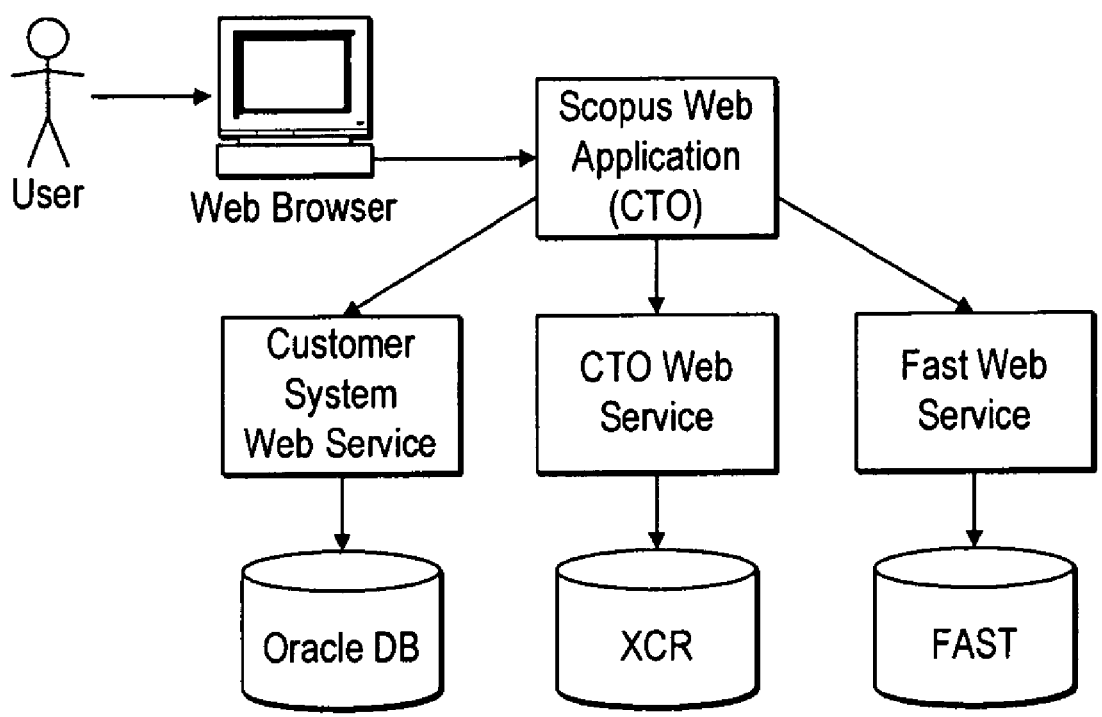
FIG. 18 depicts components of a preferred system implementing CTO.

A user then selects one or more of the listed authors via the checkboxes 1110. In this example, the author "Brownlee D. E." was selected. All documents that cite publications of that author are listed on an author citation overview page (see FIG. 12).

Figure 13:
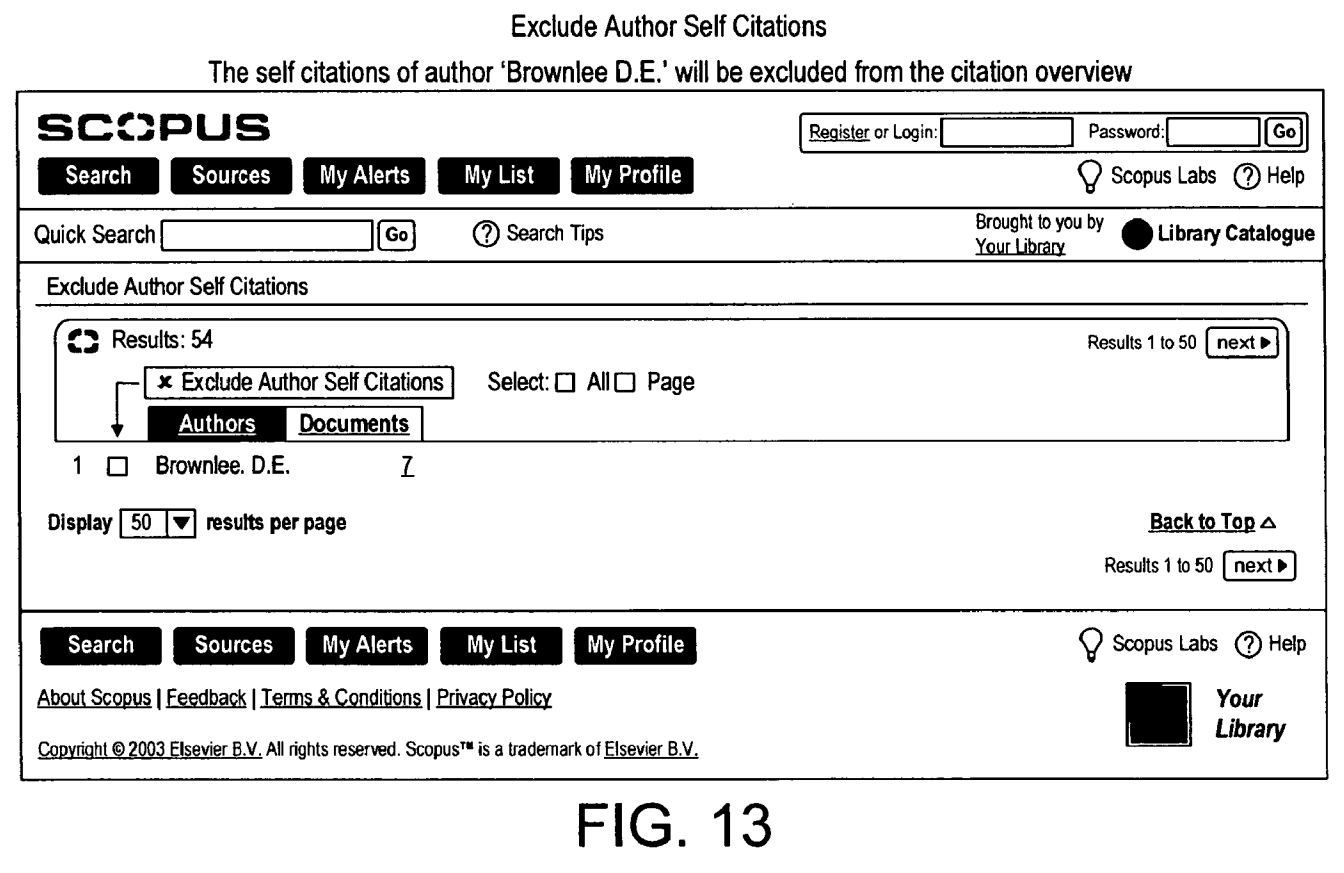

A user may click on an "Exclude Author Self Citations" button 1210 to have publications authored by the selected author (in this example, publications authored by "Brownlee D. E.") excluded from the citation overview. If multiple authors were selected at the Author search results page (see FIG. 11), then a user may select which of those authors are to have their self citations excluded (see FIG. 13).

Figure 14:
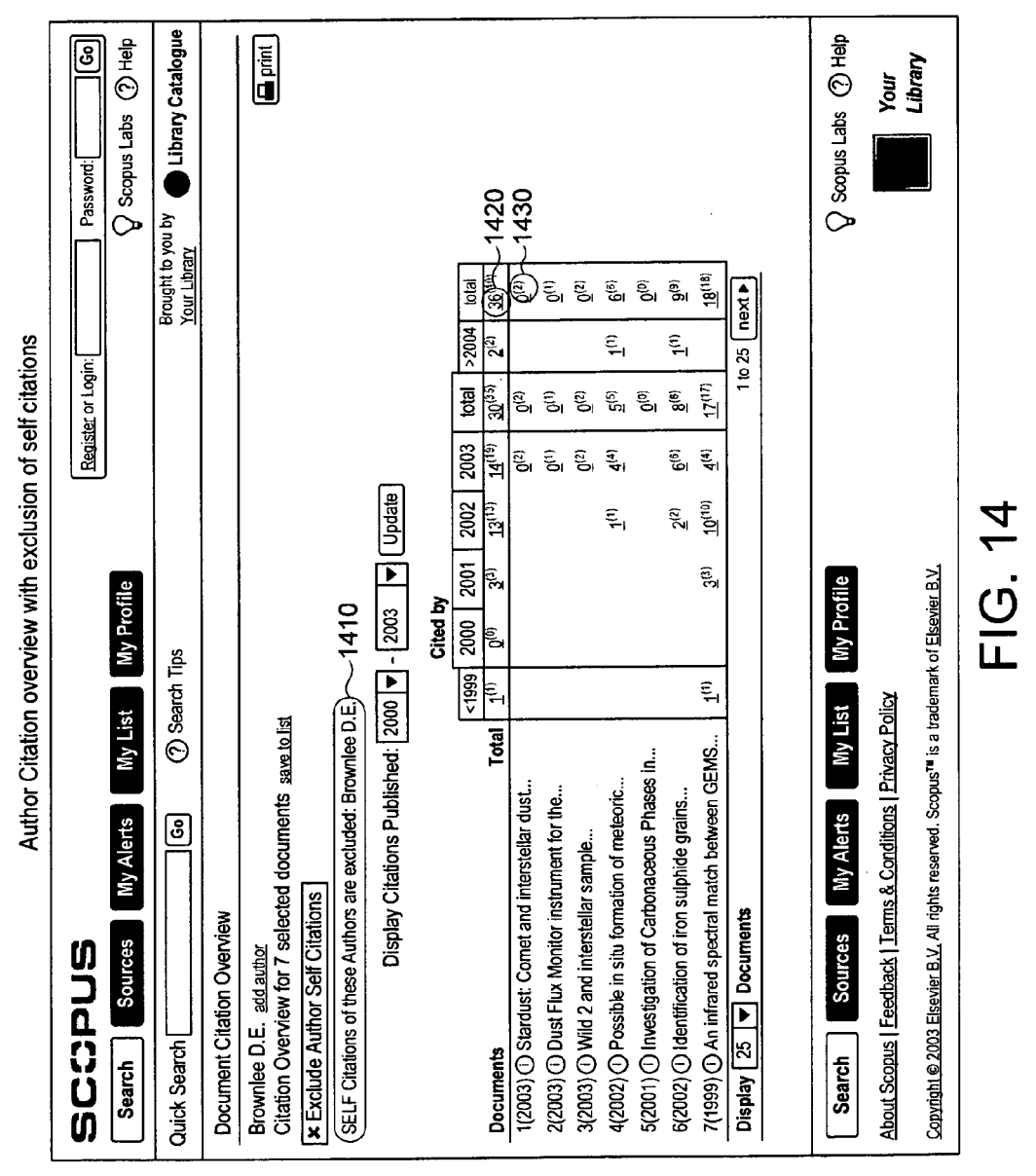

A citation overview page with excluded self citations is then displayed (see FIG. 14). A list 1410 of authors with excluded self citations is displayed. The black citation numbers 1420 (larger font) are shown as hyperlinks to search results pages (see FIG. 7). The gray numbers 1430 in parentheses are numbers of citations including self citations. The colors or other means used to distinguish these two citation counts are, of course, at the discretion of the system administrator.

In another embodiment, a user may access a citation overview page from a My List page of Scopus (see FIG. 15). The user checks boxes 1510 corresponding to documents of interest and then clicks a "citation overview" button 1520. This causes a My List document citation overview page to be displayed (see FIG. 16). Citation data for each of the selected documents is displayed.

Figure 17:
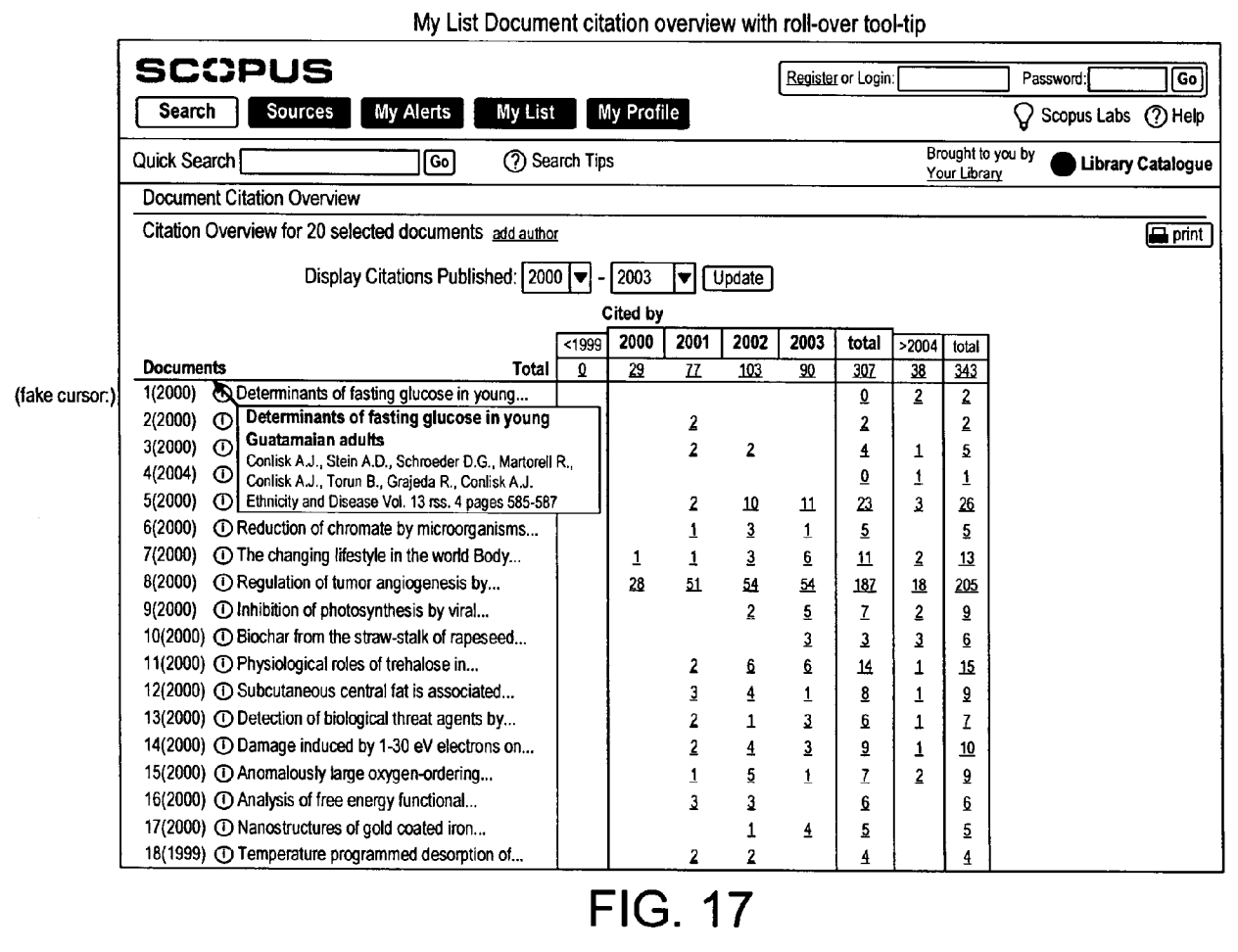

FIG. 17 illustrates how a user may mouse over a short document title to have an expanded description of the title displayed.

As discussed above, a preferred embodiment of CTO is based on a strategy that: (a) uses xdmp:estimate( ) to constrain counting activities to index-only computation; and (b) uses a combination of index techniques to optimize the caching of the indexes so that steady-state evaluation of a query will resolve disk-free. Constraints comprised: (a) one abstract per fragment and one fragment per abstract; and (b) beware potential double-counting of obsolete abstracts along with their updates.

xdmp:estimate( )is a Mark Logic function. Mark Logic's XML-based servers and services are well-known to those skilled in the art. See the website MarkLogic.com, the contents of which are incorporated herein by reference for describing Mark Logic technology. That technology is not part of the claimed invention, but understanding of that technology lends context to certain aspects of the invention.

The desired optimization is based on reducing a query to its most elemental form and then optimizing in several steps. For each cell, we need to evaluate an XQuery expression of the following form:

xdmp:estimate(items published in year N that reference item with eid E)

The following is a representative XQuery statement (similar to SQL) used by CTO.

```
xdmp:estimate(
    //item
        [.//year = $column-year]
        [.//reference-id-scp = $eid]
```

This code counts how many documents reference the current document for a given year. This is done by the following steps:

1) Find those documents that contain an element of reference-id-scp equal to the "eid" for the current document.

2) Within the documents selected from above, count those documents that contain an element of year equal to a given year value (e.g., 2000).

The first optimization step comprises writing the query as an estimated XPath:

```
xdmp:estimate(
    /xocs:doc/xocs:item/item
        [bibrecord/head/source/publicationdate/year = $column-year]
        [bibrecord/tail/reference/ref-info/refd-itemidlist/
                        itemid[@idtype = "SCP"] = $eid]
)
```

Next, we eliminate needless XPath steps to obtain the query:

```
xdmp:estimate(
    //item
        [.//year = $column-year]
        [.//reference//itemid[@idtype = "SCP"] = $eid]
```

Observe that: (a) the <year> element is uniquely used; (b)<itemid> occurs in both head and tail; and (c) evaluation of the second predicate is "unreliable" along two dimensions: reference//itemid and itemid[@attribute=value]=value.

The third optimization step comprises remapping the second predicate (by creating a new XML element in the Scopus abstracts) to achieve reliability:

```
xdmp:estimate(
    //item
        [.//year = $column-year]
        [.//reference-id-scp = $eid]
```

Observe that: (a) now we're down to three index intersections per cell node; (b)//item index will be cached after the first cell; (c) [.//year=$column-year] index will be cached after the first row; and (d) [.//reference-id-scp=$eid] index will be fetched on a per row basis.

A "range index" is a Mark Logic specific capability, similar to indexes created in general for most relational databases (such as for Oracle). However, by leveraging a range index Mark Logic brings this entire index into memory when the Mark Logic server starts. In the above example, a range index would have been created for the eid. The Mark Logic server then uses a base operating system functionality (called memory maps) to resolve the lookups from the range index contained in memory. Although not essential to CTO, it is important that the index is brought into memory, since this will eliminate nearly all I/O processing for a query. By eliminating virtually all of the I/O (and keeping the indexes in memory) we are able to achieve high-speed performance for CTO.

Mark Logic's XML-based servers and services are well-known to those skilled in the art. See the website MarkLogic.com, the contents of which are incorporated herein by reference for describing Mark Logic technology. That technology is not part of the claimed invention, but understanding of that technology lends context to certain aspects of the invention.

A fourth preferred optimization step comprises cache optimization by memory mapping the range index second predicate:

```
xdmp:estimate(
    //item
        [.//year = $column-year]
        [.//reference-id-scp = $eid]
```

Observe that all three indexes are now cached, and that only a small incremental cost is involved in sorting the memory mapped range index into document order prior to intersection.

Consideration of index intersections:

| xdmp:estimate( | Index size |
|---|---|
| //item | 60,000,000 |
| [.//year = $column-year] | 2,400,000 |
| [.//reference-id-scp = $eid] | 30 | indicates that performance is dominated by intersection with lengthy indexes. Also, note that range indexes require sorting before intersection.

To ameliorate these problems, a fifth optimization step (or sub-steps thereof) may be used:

| | Index Size |
|---|---|
| (1) Eliminate the dummy records: | |
| //reference | 11,000,000 |
| [.//year = $column-year] | 2,400,000 |
| [.//reference-id-scp = $eid] | 30 |
| (2) Eliminate the core records without references: | |
| //reference | 11,000,000 |
| [.//citation-year = $column-year] | 900,000 |
| [.//reference-id-scp = $eid] | 30 |
| (3) Eliminate the need to consider the core records at all: | |
| //core-1997 | 900,000 |
| [.//reference-id-scp = $eid] | 30 |

Test Strategy: The actual data set is irrelevant to accurate modeling, since no I/O of actual items needs to be performed during query evaluation. Test approach: (a) construct full scale "simulated" datasets with matching (1:1) indexes for index terms used by CTO query; (b) benchmark full-flight query resolution against simulated datasets; and (3) consider impact of deltas in hardware setup between various locations.

Sample Test Content—see FIG. 19.

Test Assumptions

Basic assumptions: (a) 30M dummy records @ 1K each; (b) 18.5M core records without references @ 9K each; and (c) 11M core records with references @ 100K each. Also: 30 references per record average (slightly higher than 26/27)—implemented as though records have between 0 and 60 references. Distribution of records over years: assume 80% of records come from a 10 year span, and assume maximum of 8% of core records in a single year. Finally assume itemid [@idtype="SCP"] element values are 32-bit positive integers.

Test Results—see FIGS. 20 and 21.

The tests assume 29,000,000 total records (Scopus abstracts) uniformly distributed through 10 forests across 2 dual CPU Solaris systems (SunFire v240s), separate single query evaluation server, all servers CIS 2.2-prealpha. Of these 29,000,000 records, 11,000,000 records contain reference information.

Below, a typical query will consist of the calculation of 100 cells. A cell would be equal the cross-section of 1 year value (e.g., 1996) and all of the references for a specified document for that given year.

The following query maps to the fourth optimization step:
   xdmp:estimate(//item[.///year=$year][.//reference-id-scp=$eid])

Query time (95% of queries): 280 ms; per cell: 2.8 ms. This query has been used in production.

The following query maps to the fifth optimization step, part 1 (eliminate the dummy records).
   xdmp:estimate(//references[.//year=$year][.//reference-id-scp=$eid])

Query time (95% of queries): 187 ms; per cell: 1.87 ms.

The following query maps to the fifth optimization, part 3 (eliminate the need to consider core records).
   xdmp:estimate(//core-1997[.//reference-id-scp=$eid])

Query time (95% of queries): 140 ms; per cell: 1.4 ms.

The "naïve" prior art query (see Background & Summary discussion above) would not even run against a corpus of documents of this size. This is largely due to the number of physical I/Os that would have been required when resolving the prior art query. In essence, one I/O would have been required for nearly every document (containing references) in the corpus (in this case, nearly 11 million). Assuming 10 ms per physical I/O, and each of the 10 forests distributed on a separate disk, this would have led to the following approximated minimum query resolution time and per cell calculation times.

Query Time: 11,000 s (or approximately 180 minutes); per cell: 110 s (or approximately 1.8 minutes).

Clearly, the optimized query is significantly faster than the prior art query. Even when only the fourth optimization step is used, the search time per cell is reduced by (110 s−0.0028 s)/110 s=99.9975%. Put another way, the prior art query approach takes almost 40,000 times as long as the new approach (using the fourth optimization step).

Further speed improvement may be obtained using the fifth optimization step (or parts thereof). However, implementation of that step may require adding elements to the data, and this may be undesirable in some circumstances. The system can achieve consistent performance regardless of query type (and without the need to add additional elements to the data) without implementing the fifth step.

While particular elements, embodiments, and applications of the present invention have been shown and described, it should be understood that the invention is not limited thereto, since modifications may be made by those skilled in the art, particularly in light of the foregoing teaching. The appended claims are intended to cover all such modifications that come within the spirit and scope of the invention. Although multiple embodiments are described herein, those embodiments are not necessarily distinct—features may be shared across embodiments.

We claim:

1. A method comprising:
    receiving a query for citation information;
    writing an XQuery statement based on said query, as an estimated XPath;
    removing needless XPath steps from said XQuery statement written as an estimated XPath, said removal of needless XPath steps resulting in at least one predicate being unreliable along two dimensions;
    remapping said at least one unreliable predicate to achieve reliability;
    sending at least one predicate index associated with said XQuery statement to memory;
    memory mapping said at least one predicate index; and
    resolving, via a computer, said query entirely out of indexes, said indexes including said at least one predicate index.

2. The method of claim 1, wherein said citation information comprises the number of times a publication was cited.

3. The method of claim 1, wherein said citation information is resolved from a database containing publication information.

4. The method of claim 3, wherein said database is an XML-based database.

5. The method of claim 2, wherein said citation information further comprises an author name.

6. The method of claim 2, wherein said citation information further comprises a publication title.

7. The method of claim 2, wherein said citation information further comprises a journal title.

8. The method of claim 2, wherein said citation information further comprises a year of publication.

9. The method of claim 2, wherein said citation information further comprises a related keyword.

10. The method of claim 5, wherein said citation information further comprises an institute associated with at least one author name.

11. A system comprising:
    a server for receiving a query and transmitting data to a web browser, wherein said data comprises citation information;
    a processor, coupled to said server, for obtaining citation information using at least one XQuery statement based on said query, wherein at least one of said at least one XQuery statement is written as an estimated XPath with needless XPath steps removed, said removal of needless XPath steps resulting in at least one predicate being unreliable along two dimensions;
    said processor being further for remapping said at least one unreliable predicate to achieve reliability;
    memory for storing at least one predicate index associated with said at least one XQuery statement, wherein said at least one predicate index is stored in said memory and is memory mapped;
    and said processor being further for resolving said query entirely out of indexes, said indexes including said at least one predicate index.

12. The system of claim 11, wherein said citation information comprises the number of times a publication was cited.

13. The system of claim 11, wherein said citation information is resolved from a database containing publication information.

14. The system of claim 13, wherein said database is an XML-based database.

15. The system of claim 12, wherein said citation information further comprises an author name.

16. The system of claim 12, wherein said citation information further comprises a publication title.

17. The system of claim 12, wherein said citation information further comprises a journal title.

18. The system of claim 12, wherein said citation information further comprises a year of publication.

19. The system of claim 12, wherein said citation information further comprises a related keyword.

20. The system of claim 15, wherein said citation information further comprises an institute associated with at least one author name.

* * * * *